United States Patent [19]
Hazan et al.

[11] Patent Number: 5,183,996
[45] Date of Patent: Feb. 2, 1993

[54] COOK-TOP

[75] Inventors: Jean-Pierre Hazan, Sucy-En-Brie; Rémy Polaert, Villecresnes; Gilles Delmas, Epinany-Sous-Senart, all of France

[73] Assignee: U.S. Philips Corp., New York, N.Y.

[21] Appl. No.: 724,243

[22] Filed: Jul. 1, 1991

[30] Foreign Application Priority Data
Jul. 6, 1990 [FR] France .............. 90 08597

[51] Int. Cl.⁵ .............................. H05B 3/74
[52] U.S. Cl. .................. 219/452; 219/464; 219/518; 219/446
[58] Field of Search .............. 219/464, 446, 448, 451, 219/452, 453, 518; 177/132, 245

[56] References Cited
U.S. PATENT DOCUMENTS

| | | | |
|---|---|---|---|
| 4,476,946 | 10/1984 | Smith | 219/518 |
| 4,481,409 | 11/1984 | Smith | 219/518 |
| 4,521,658 | 6/1985 | Wyland | 219/518 |
| 4,595,827 | 6/1986 | Hirai | 219/518 |
| 4,650,970 | 3/1987 | Ohouchi | 219/518 |
| 4,733,054 | 3/1988 | Paul | 219/518 |
| 4,885,446 | 12/1989 | Liu | 219/518 |
| 4,895,067 | 1/1990 | Ohji | 219/518 |

Primary Examiner—Teresa J. Walberg
Attorney, Agent, or Firm—Ernestine C. Bartlett

[57] ABSTRACT

A cook-top (10) includes a plurality of heating elements (11a, 12a) which are activated by function controls. The heating elements are covered by a plate (15) which are fixedly connected to strain-guage modules (30) which detect the forces exerted on the plate as a result of loads placed on the heating elements. By computing the center of gravity of the forces, controls (70, 75, 76) identify a heating element whose load has varied and influence its electric power supply. The power supply may then be turned off, reduced or controlled. The function controls may be pressure-sensitive touch controls.

14 Claims, 7 Drawing Sheets

COOK-TOP

FIELD OF THE INVENTION

The invention relates to a cook-top comprising a plurality of heating elements which are activated by function controls.

BACKGROUND OF THE INVENTION

The cook-tops mentioned herein are preferably though not exclusively intended for domestic use. They comprise a plurality of localized cooking sections for heating the contents of kitchen utensils. The heating means generally comprise elements for heating by the Joule effect, by radiation or by induction. During use the heating element must be turned on, the power consumption must be adjusted, in some cases several times, and finally the heating element must be turned off.

When the utensil is lifted briefly, the user does not necessarily intend to stop the operation of the heating element. This may have different consequences for example, there is a useless electric power dissipation, and the temperature of the heating element, which then operates without load, is difficult to control and the element may produce radiation which may hinder or even harm the user by dazzling or scalding.

Therefore, it is desirable that the operation of the heating element can be controlled during said operations. Obviously, this should not have any consequences for the operation of the other heating elements.

U.S. Pat. No. 4,476,946 describes a cook-top which can be used as a weighing platform and which controls the electric power consumed by a plurality of heating elements arranged in the platform. According to the patent, one or several heating elements can be arranged separately in a system of strain gauges which bend under the influence of a load placed on the heating element. These strain gauges are electrically arranged as a Wheatstone bridge and thus enable the weight of the load placed on the heating element to be determined. This measure can be used for controlling, for example, the evaporation rate of the load when this is, for example, a pan containing a liquid, by controlling the electric power consumed by the heating element.

However, such a cook-top poses cleaning problems. The heating elements and the cooking sections are movable relative to the platform, which requires a certain clearance which inevitably gives rise to leakage. Therefore, this cook-top does not meet current demand, which attaches great importance to the cleaning facilities and the ease of cleaning the cook-top.

An object of the present invention is therefore to identify a means to combine easy cleaning and the detection of the presence or absence of a load on an arbitrary heating element in order to identify this element to allow its operating conditions to be influenced.

SUMMARY OF THE INVENTION

These and other objects are accomplished according to the invention wherein the heating elements are covered by a plate which is fixedly connected to strain-gauge modules which detect the forces exerted on the plate by loads placed above the heating elements, control means identifying such a heating element whose load has been subjected to a variation, by computing the center of gravity of said forces, and influencing its electric power supply.

Thus, the location where the load is (was) situated on the plate can be derived from the change in weight of this load. The location of the underlying heating element can be determined easily by the control means. Preferably, the plate is a glass-ceramic plate. This material is a good thermal insulator. Moreover, the strain-gauge modules are remote from the heating elements and a heat shield provides additional thermal protection.

In one embodiment of the invention, the control means turn off or reduces the electric power supply to the identified heating element when its load is removed (relative variation of the load near the unit). At the beginning the user activates (for example) a relay or a push-button by means of the function controls, which elements can be deactivated electronically or electromechanically by said control means.

In another embodiment, the control means control the electric power supply to the identified heating element when the relative load variations are small. This allows monitoring of cooking processes.

The load variations can be determined by comparing the values of the load at regularly spaced successive instants.

Thus, there will be a change in the operating condition of the heating plate if the user merely lifts a utensil.

The strain-gauge modules may have different arrangements underneath the plate. Thus, in a first mechanical arrangement, without a separate external load being applied, the main load of the strain gauges is formed by the glass-ceramic plate. In a second mechanical arrangement, without a separate external load being applied, the strain-gauge modules support substantially the entire weight of the cook-top including not only the plate itself but also the heating elements, said control means and the function entry means for the user. In this second arrangement the gauges are always loaded at least by the weight of the cook-top. This arrangement is particularly effective when the plate is supported by three strain gauges in order to extend the useful area of the supporting triangle defined by the three modules. It is also possible to support the plate by means of four strain-gauge modules, which define a larger supporting area at the expense of a small amount of additional material. During assembly it is then necessary to ensure the simultaneous support of the four gauges.

Preferably, the control means comprise a microprocessor which receives data from an analog-to-digital converter which processes the electrical signals supplied by the strain gauges.

However, a simplified construction is possible by directly processing the analog signals supplied by the strain gauges. This simplifies processing. In this case it is adequate to utilize for example one heating element arranged closer to one of the strain gauges than the other heating elements, which results in an increased detection sensitivity for this heating element. It is also possible to electronically increase the gain of the amplifier associated with this strain gauge. For this purpose the variation (decrease) of the weight detected by this gauge is compared with the total weight variation. When the ratio is high (for example higher than 45–50%) the control means detect that an object placed on this heating element has been removed and turn off the relevant heating element. Both modes (analog or digital processing) can be used together on the same plate.

The variation of the load exerted on the plate can be processed to provide a measure of the weight related to the load variation in order to realize a weighing function. In this case the variation of the load applied to a preferential or non-preferential area of the plate is converted into a measure of the weight by means which compute and display the weight of the load. This preferential area may be situated above a heating element. This allows the cooking process to be monitored. To obtain precise measures in the case of small load variations the computing means may enable taring to be applied for the initial load. The term taring as used herein means a deduction from the gross weight of a substance and its container made in allowance for the weight of the container.

The cook-top comprises a plurality of heating elements arranged underneath the plate. One cooking section may comprise a plurality of these heating elements to obtain, for example, an oblong configuration.

In order to obtain a large range of models the designer can modify these configurations without having to alter the arrangement of the heating elements, by simply programming the microprocessor.

Thus, the control means can be programmed to define the area of a heating section by functionally rearranging a plurality of heating elements.

Until now the plate covering the heating elements has been described as a plate adapted to receive loads placed above the heating elements. However, it is also possible to adapt the plate to detect other pressure forces, in particular those which can be applied by manual pressure by the user. A zone of the cook-top may be reserved for this purpose to allow the user to give manual commands. Thus, the plate may comprise at least one touch-control zone for manual actuation of the function controls. (For example, power and on/off control of the heating elements). The place of the pressure, for example of a finger, defines the command to be carried out. This command may also utilize the magnitude of the applied pressure to define an additional way of starting manual commands. The location and/or the duration and/or the magnitude of this pressure may be related, for example, to the electric power consumed by a given heating element. The designer can freely choose the number and the arrangement of the touch controls, which can be arranged on the plate at the desired location. Thus, the designer can rearrange the touch controls, starting from a basic model, by programming.

The touch-control zones can be marked by engraving the plate.

BRIEF DESCRIPTION OF THE DRAWINGS

The invention will now be described in more detail, by way of non-limitative example, with reference to the following drawings, in which:

FIG. 3C shows the displacement of the supporting polygon when the load supported by the strain-gauge modules is the glass-ceramic plate alone or the entire cook-top.

DESCRIPTION OF PREFERRED EMBODIMENTS

Figure 1A:
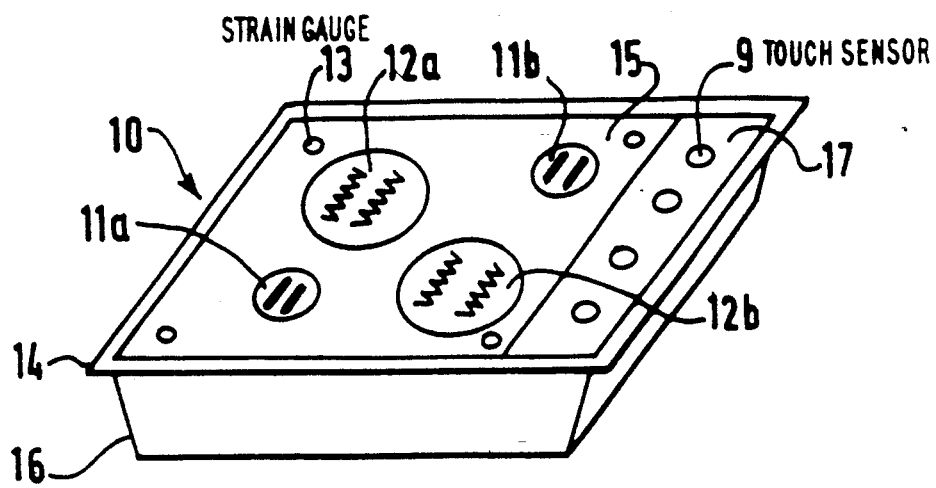
FIG. 1A is a diagrammatic view of a cook-top.

FIG. 1A shows a cook-top 10 comprising heating elements 11a, 11b, 12a and 12b arranged underneath a glass-ceramic plate 15 which is supported by a metal frame 14 and a casing 16. At one side the cook-top 10 has a zone 17 which accommodates the function controls 9 employed by the user for controlling the operation of the cook-top. These controls are usually rotary knobs 9. Windows 13 can indicate when a heating element is operative or when its temperature is still above a certain critical value.

Figure 1B:
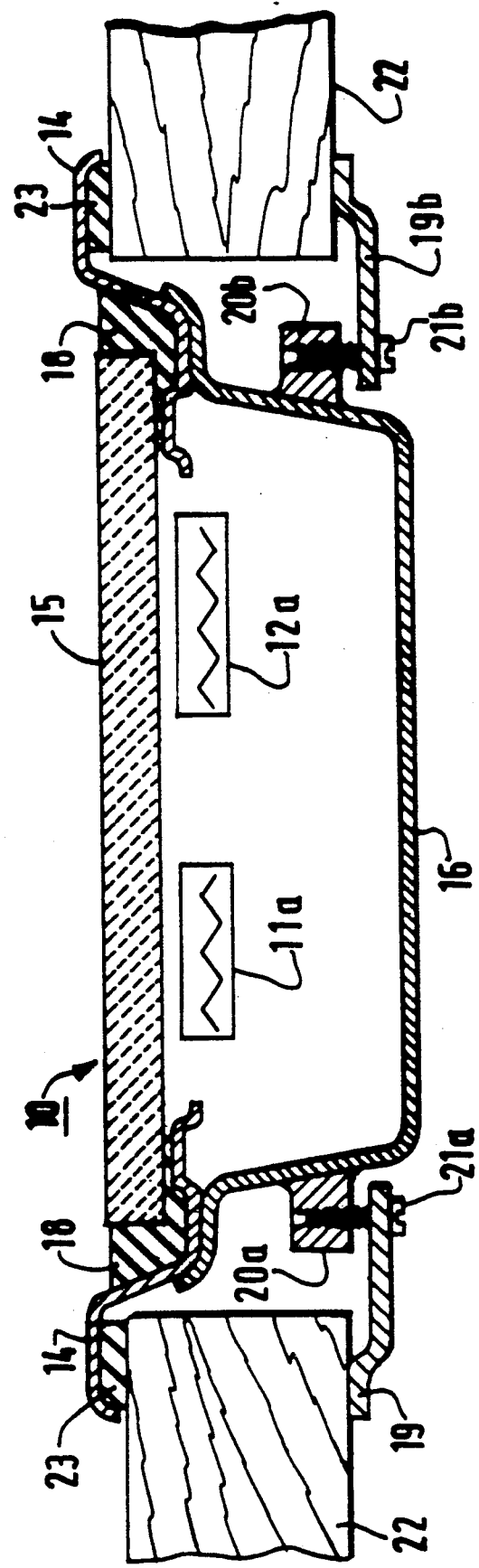
FIG. 1B is a diagrammatic sectional view of the principal elements of a prior-art cook-top comprising a glass-ceramic plate.

FIG. 1B shows a conventional construction for a cook-top 10 having a glass-ceramic plate 15 above heating elements 11a, 12a. This plate is connected to the metal frame 14 by means of an elastomer seal 18. The metal frame is secured, for example by means of screws, to the casing 16 which comprises fixing means formed by, for example, brackets 19a, 19b, studs 20a, 20b and screws 21a, 21b, to secure the cook-top to the base 22 of a kitchen-furniture unit. The heating elements are secured to the casing. To ensure a correct sealing between the metal frame 14 and the base 22 a seal 23, generally made of foam, is fitted during installation.

In accordance with the invention the construction of the cook-top is such that either the glass-ceramic plate alone (if desired with its metal frame) or the entire cook-top is supported by strain-gauge modules.

Figures 2A, 2B:
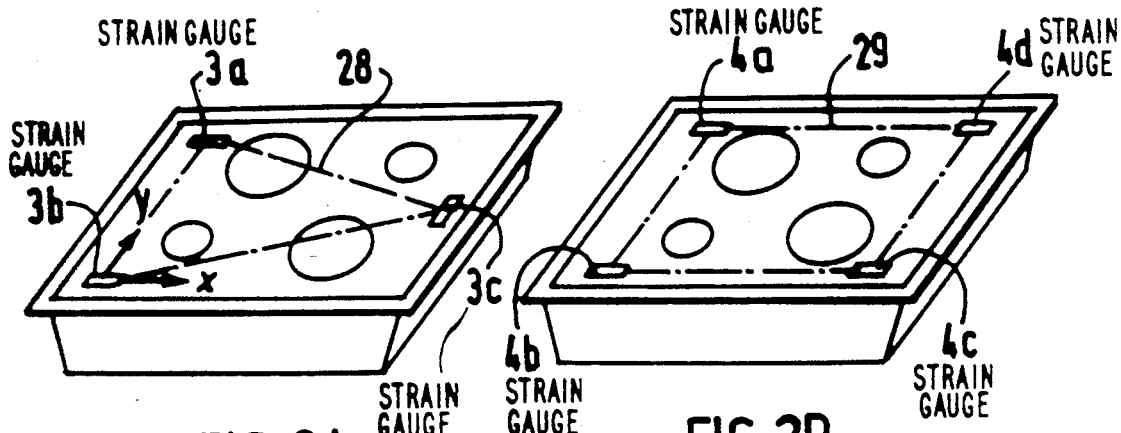
FIGS. 2A, 2B and 2C show cook-tops with three and four modules, and a diagram of the applied forces.

The cook-top may comprise an arrangement with three strain-gauge modules 3a, 3b, 3c (FIG. 2A) or with four modules 4a, 4b, 4c, 4d (FIG. 2B), so that the supporting polygon has the form of a triangle 28 or a rectangle 29.

Figure 2C:
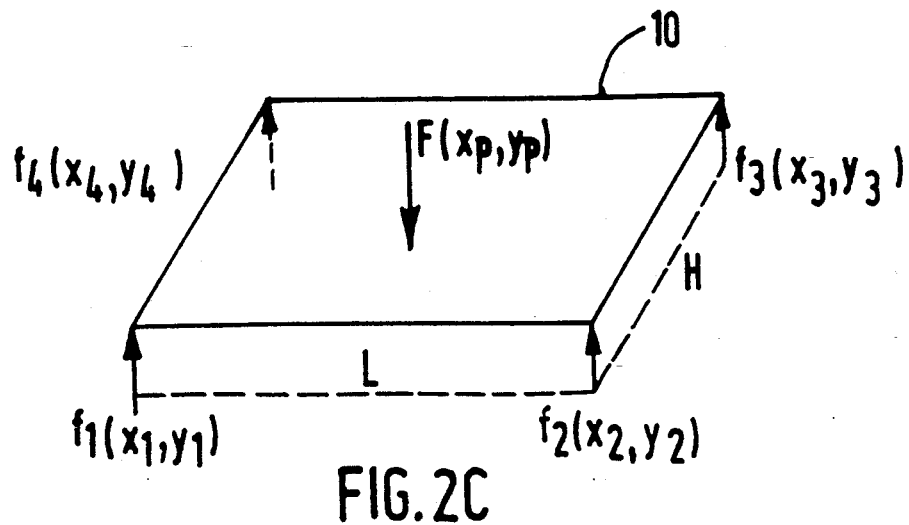

When a pan is placed on the glass-ceramic plate (for example with four modules) above a heating element, it will exert a force of gravity which acts on the four modules, which will produce reactive forces f1, f2, f3, f4 (FIG. 2C).

Upon a load variation these reactive forces will change and the four modules will produce new reactive forces, which are processed by the microprocessor to define the variations $\Delta f1$, $\Delta f2$, $\Delta f3$, $\Delta f4$. These enable the total load variation $\Sigma \Delta f = \Delta f1 + \Delta f2 + \Delta f3 + \Delta f4$ and the position $X_p$, $Y_p$ of the center of gravity to be computed by means of the equations:

$$X_p = \frac{\Delta f3 + \Delta f4}{\Sigma \Delta f} \cdot L \text{ and } Y_p = \frac{\Delta f1 + \Delta f4}{\Sigma \Delta f} \cdot H$$

where L and H are the two dimensions of the plate.

By proceeding as described hereinafter it is surprisingly found that not only the center of gravity of an object which has been added can be determined but also of an object which has been removed and is therefore no longer present on the plate.

If for one object at the same location the final state is compared with the initial state this will yield force variations of opposite signs but of equal absolute values, depending on whether an object has been removed or added.

However, since the position is given by a relation of force variations, as indicated by the above equations, the signs have no effect and the same position is found in both cases. Thus, the center of gravity of the removed object is that of an object to be added to the final state to find the initial state.

For detecting the position of the center of gravity (barycentre) of the object which has been placed or withdrawn it is necessary to store a previous state of the plate (forces exerted on the strain gauges) and subsequently to compare the new state with the preceding state in order to determine the nature and the location of the effected change. The electrical signals from the various strain gauges are processed by a microprocessor, which determines the center of gravity of the applied or removed load and which influences the electric power supply to the relevant element. For this purpose zones S1, S2 etc. above each of the heating elements are defined on the plate. The coordinates of these zones are stored in, for example, the memory of the microprocessor. After a change in load the microprocessor determines on the basis of the new and the old state of the plate the center of gravity of the load which has been added or removed, and subsequently determines if it is situated in one of these zones S1, S2 etc. For each of the zones S1, S2 etc. the memory of the microprocessor also stores the state of the corresponding load P1, P2, . . . When a change has taken place in a specific zone the value of the variation of the corresponding load enables the action to be taken (i.e. stop, reduce or control the heating element) to be determined, and the value of the new load corresponding to the zone is stored in the memory. It is also possible to use systematic, for example periodic, updating. Each zone corresponding to each heating element is thus characterized by its area and the load present at a given instant, which information is stored in the microprocessor. When the center of gravity of the load which has been added or removed is situated outside one of these zones, this does not result in a heating element being influenced directly. However, in the memory the forces exerted on the strain gauges for this new state are updated to define the prior state necessary for the computation of subsequent variations.

Moreover, it is to be noted that, since only one object at a time is applied or removed, it is not only possible to know the overall state of the plate (center of gravity and total weight of the objects on the plate) but also to monitor and store the weight and the position of each object present on the plate.

Depending on the magnitude and the position of the applied force, selective influencing is possible by providing a threshold beyond which no action at all will be taken. This makes it possible to ignore certain actions by the user for which the operation of the heating elements need not be changed. This threshold makes it possible to allow for a partial variation of the load, for example the removal of a lid. This threshold can be reduced or cancelled by a specific command to monitor the progress of certain cooking processes.

Figure 3A:
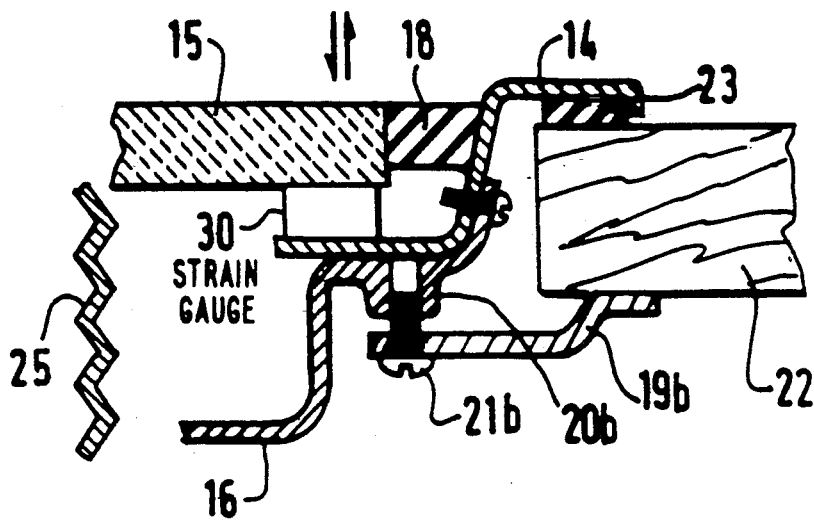
FIGS. 3A, 3B and 3C are diagrammatic views of parts of different arrangements of strain-gauge modules in accordance with the invention.

FIG. 3A shows the arrangement of the elements in the case that only the glass-ceramic plate is supported by the strain-gauge modules 30. These modules are arranged between the metal frame 14, which is stationary, and the glass-ceramic plate 15, which is movable. To ensure nevertheless a correct sealing between these two elements it is necessary to provide a seal 18 which in the present arrangement should take the form of a thin diaphragm in order not to impede the movements of the glass-ceramic plate relative to the metal frame. The fixing means 19b, 20b, 21b and the sealing means 23 are not modified. The modules 30 are isolated from the heating elements by means of a heat shield 25.

Figure 3B:
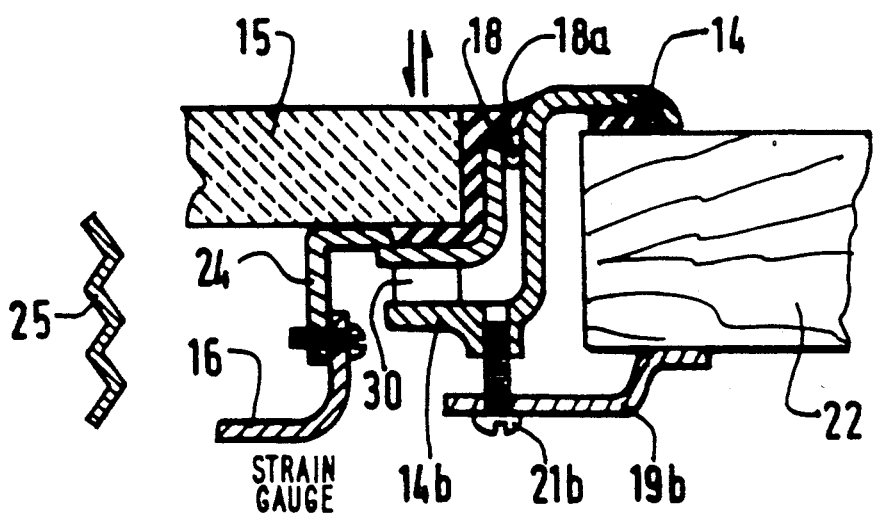

FIG. 3B shows another arrangement for which substantially the entire cook-top is supported by the strain-gauge modules. The metal frame 14 then forms a seating 14b which receives a strain-gauge module which carries another metal frame 24 secured to the casing 16. the other metal frame 24 receives the glass-ceramic plate 15. It improves the mechanical strength of the plate. The metal frame 14 comprises as many seatings 14b as there are strain-gauge modules. Sealing between the movable and the stationary part is now effected by means of, for example, an elastomer seal 18 which is provided between the metal frame 14 and the other metal frame 24 and which is retained by a retaining element 18a, for example an O-ring, while it is still fluid during its manufacture. Securing to the base 22 is effected by means of the bracket 19b and the screw 21b, which is fitted for example in the seating 14b.

Figure 3C:
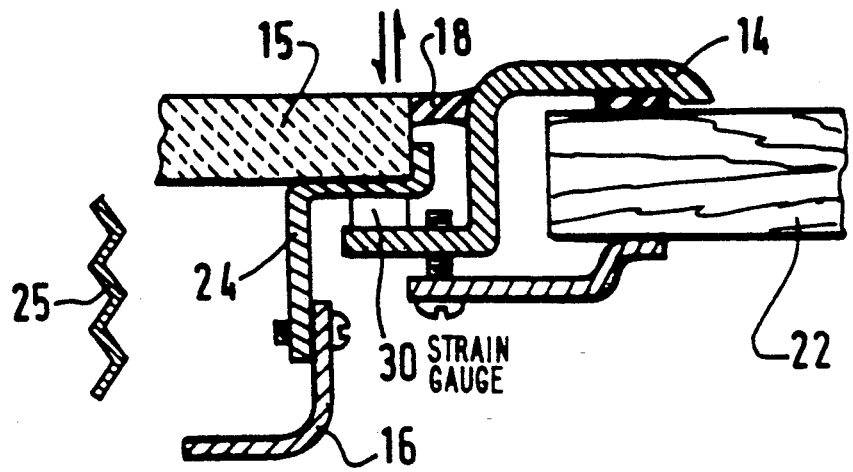
Figure 3D:
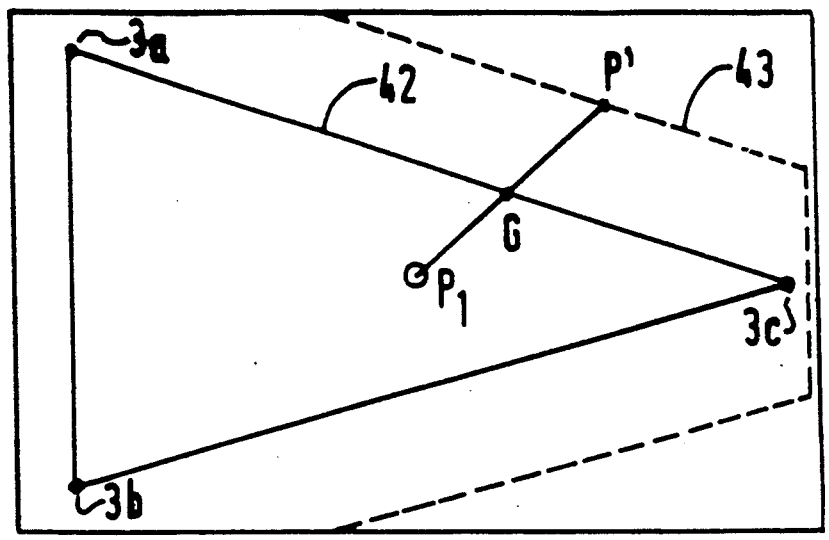

FIG. 3C shows another arrangement which differs from that shown in FIG. 3B in that sealing is realized by means of a sealing diaphragm 18 arranged between the glass-ceramic plate 15 and the metal frame 14. In the arrangements shown in FIGS. 3B and 3C the strain-gauge modules, in the absence of a separate external load, support the glass-ceramic plate, the heating elements, the casing as well as the other metal frame, i.e. substantially the entire weight of the cook-top. This may be a weight of the order of 8 kg, which forms a zero offset in determining the forces exerted on the glass-ceramic plate. This is utilized for determining small forces applied outside the supporting polygon of the plate, in particular when this is a triangle (FIG. 3D). When a substantial load is placed at P' outside the supporting triangle (42) the load exerted on the facing strain-gauge module 3b may decrease. The fact that the entire cook-top is supported by the modules, i.e. with an overall load centered in P1, has the advantage that all the modules can always operate in compression even with loads whose centre of gravity is situated comparatively far from the supporting polygon. The effective supporting polygon is then bounded by a triangle similar to the supporting triangle at rest and by the edges of the plate (polygon 43). This results in a larger effective cook-top area in which a load variation can be detected.

In arrangements where a loss of contact may occur (for example a substantial weight placed outside the supporting triangle and/or a small supporting triangle) the strain-gauge module can be mounted in a bracket fixed to the glass-ceramic plate to allow the strain gauge to be loaded in two directions (positive and negative strain).

Figure 4A:
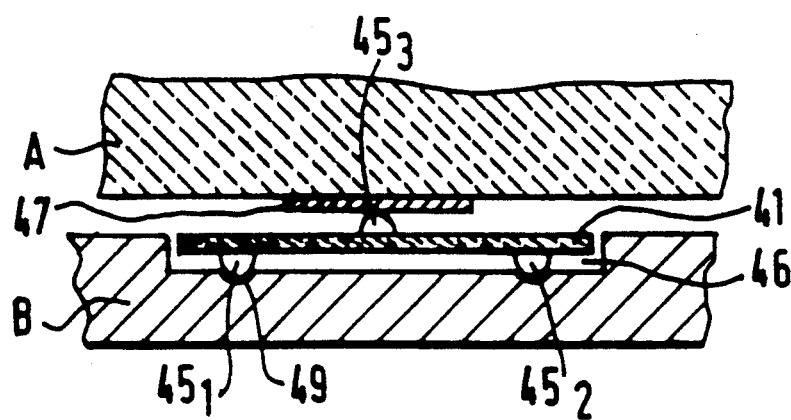
FIGS. 4A, 4B, 4C, 4D and 4E show diagrammatically a module with three supporting points and its strain-gauges.
Figure 4B:
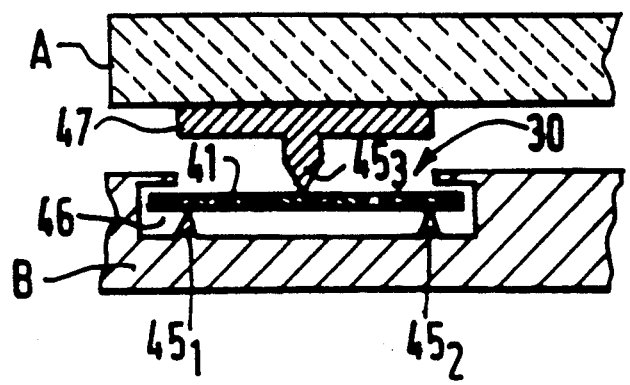

FIG. 4A shows a method of arranging a strain-gauge module placed between a part A and a part B, which be constituted respectively by:

the glass-ceramic plate 15 and the metal frame for FIG. 3A, and the other metal frame 24 and the seating 14b for FIGS. 3B and 3C.

Figure 4C:
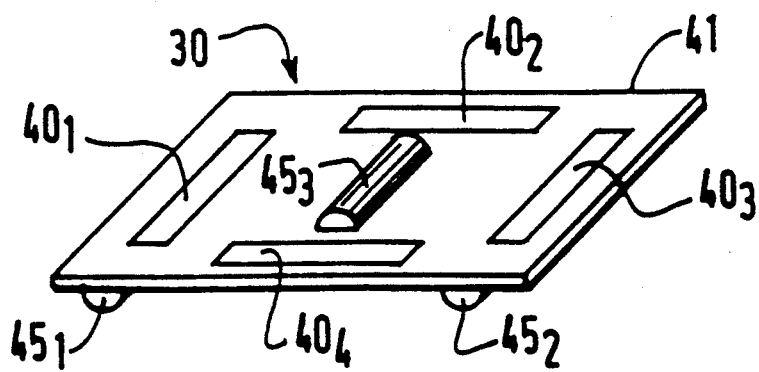

The module 30 (FIG. 4C) comprises a plate 41 of, for example, aluminum on which resistors $40_1$, $40_2$, $40_3$, $40_4$ are formed, for example as thick films by silk-screening. The inner surface of the plate carries two supports $45_1$ and $45_2$ at the ends. Substantially in the centre, i.e. between the two supports $45_1$ and $45_2$, and the upper surface of the plate 41 carries another support $45_3$. The distance between the supports is consequently fixed. Therefore, the plate 41 can deform when a force is exerted on the support $45_3$ and a reaction is obtained via the supports $45_1$, $45_2$ by the support on which the plate 41 is placed. The vertical distance between the center of the inner surface of the plate 41 and the part B can thus be pre-adjusted accurately in order to limit the displacement of the plate 41 and thereby prevent it from breaking. The resistors $40_1$ to $40_4$ are arranged as a Wheatstone bridge in such a way that the module is in the first place sensitive to the applied load and in the second place is highly insensitive to temperature variations. The module 30 is then arranged as shown in FIG. 4A, in such a way that the lower supports $45_1$, $45_2$ bear on the part B and the upper support $45_3$ bears on the part A, if desired in recesses 49. The module 30 is arranged in a recess 46 formed in the part B to limit its lateral displacement. When the part A is the glass-ceramic plate it is preferred to provide a metal or insulating shield, which has the advantage that it spreads the force on the glass-ceramic plate, that it prevents local damaging and that it forms a heat shield. Obviously, the support $45_3$ may also be fixedly connected to the part A and detached from the plate 41.

Figure 4D:
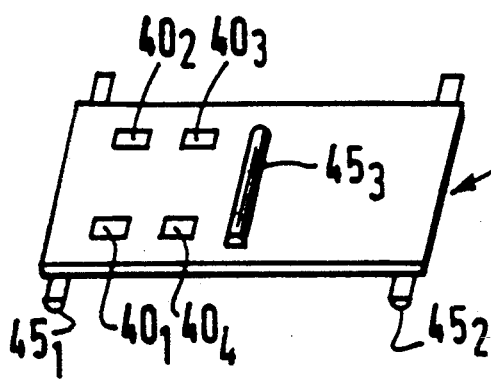

FIG. 4D shows another arrangement of the resistors $40_1$ to $40_4$ on the plate 41, i.e. substantially at the same side of the plate 41. In comparison with the arrangement shown in FIG. 4C this arrangement has the advantage that the axis of the fulcrum $45_3$ does not pass through the resistor zone and that the sensitivity of the strain gauge is hardly affected by the exact position of this fulcrum.

Figure 4E:
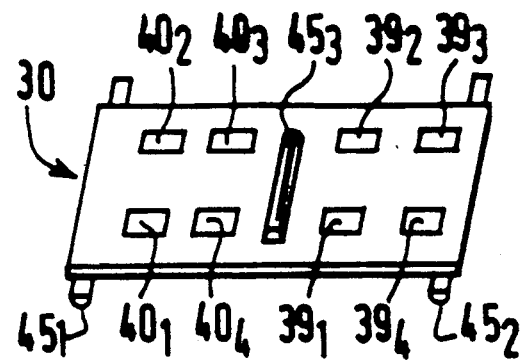

In order to increase the detection sensitivity of the module 30 it is possible, as is shown in the diagram of FIG. 4E, to double the number of Wheatstone bridges, the four strain gauges $40_1$ to $40_4$ forming a first Wheatstone bridge and the four strain gauges $39_1$ to $39_4$ forming a second Wheatstone bridge. The output signals of the two bridges can be added to obtain a larger signal/force ratio.

The resistors may be arranged on one and/or the other surface of the plate in order to provide a better protection against mechanical, thermal or other damage or to increase the sensitivity.

Figure 5:
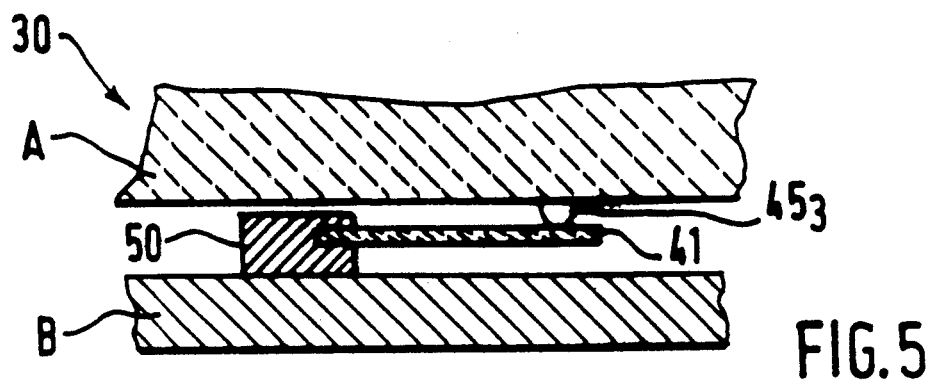
FIGS. 5 and 6 show a module with two supporting points and a module with four supporting points with S-deformation.

FIG. 5 shows another module 30. In this case the part B has a protuberance 50 in which the plate 41 carrying the strain gauges is clamped. This is a cantilever arrangement. The support $45_3$ acts on the free end. It may be fixedly connected either to the part A or to the plate 41. The clearance between the plate 41 and the part B can be determined so as to limit the deflection of the plate 41 to preclude breakage.

Figure 6:
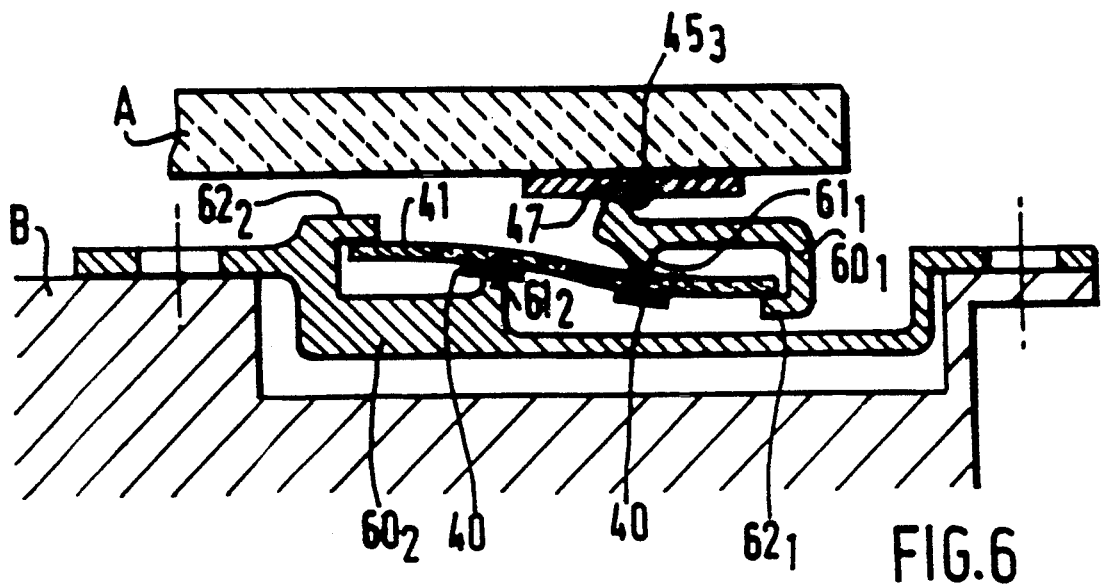

FIG. 6 shows another strain-gauge module in which the support 41 is subject to an S-like deformation. For this purpose the support 41 is clamped between two brackets $60_1$ and $60_2$, which are in contact with the parts A and B respectively. The bracket $60_1$ (and $60_2$) comprises an abutment $61_1$ (and $61_2$ respectively), which transmits a force to the surface of the substrate at a distance from the edge, and a pin $62_1$ (and $62_2$) which exerts a reactive force on the end of the substrate. Under the influence of the obtaining forces the substrate 41 is subject to an S-deformation. Preferably, the resistors 40 are arranged in such a manner that some are loaded in compression and others in expansion in order to increase the detection sensitivity in that their effects are added when they are arranged as a Wheatstone bridge. In FIG. 6 the abutment $61_2$ extends between the resistors.

Figure 7:
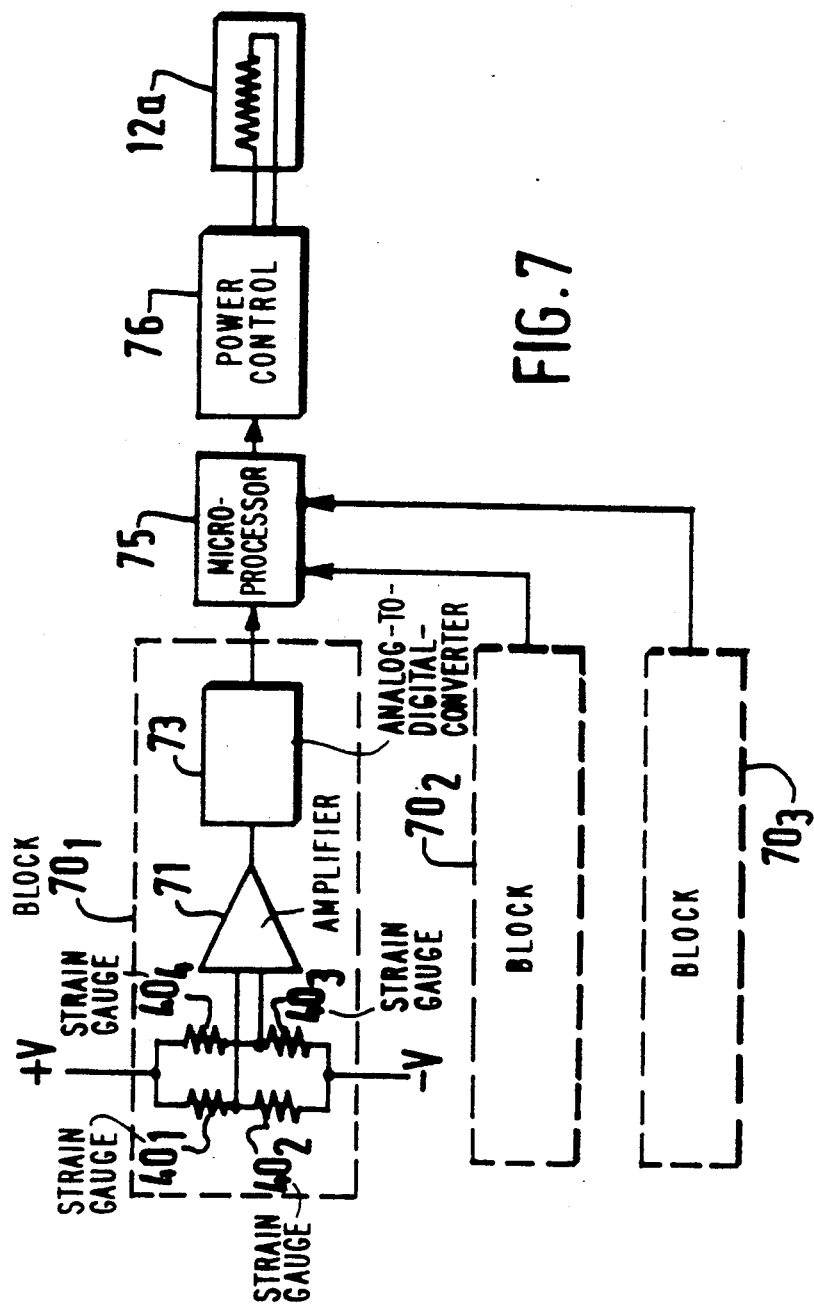
FIG. 7 is an electrical diagram of the control means in an embodiment comprising three modules.

FIG. 7 shows the control means with which the operation of the heating elements can be controlled. The strain gauges $40_1$ to $40_4$ are arranged as a bridge, one arm of the bridge being energized by a power source $+V$, $-V$ or by an alternating voltage source and the other arm of the bridge supplying the unbalance signal, which is applied to the input of a differential amplifier 71 whose output signal is digitized by an analog-to-digital converter 73. A block $70_1$ comprises strain gauges, the differential amplifier and the analog-to-digital converter. The number of blocks is equal to the number of modules, for example the blocks $70_1$, $70_2$, $70_3$ are provided for a cook-top comprising three strain-gauge modules. The outputs of the three blocks are fed to a control logic unit, for example a microprocessor, which determines the center of gravity. It also controls the memory for the information about the position and magnitude of the applied loads and the operation of the plate. The microprocessor 75 activates a power control 76 for each heating element, for example the element 12a.

In the simplified version the differential amplifiers of each block 70 activate the power control 76 without digitization of the signal. In this way, for example, the variation (decrease) of the signal from each block 70 will be compared with the sum of all the signals from the blocks 70. If by means of an electronic comparator the variation of one of these signals is found to be larger than a given ratio, for example 45 or 50%, the power control 76 is activated.

Figure 8:
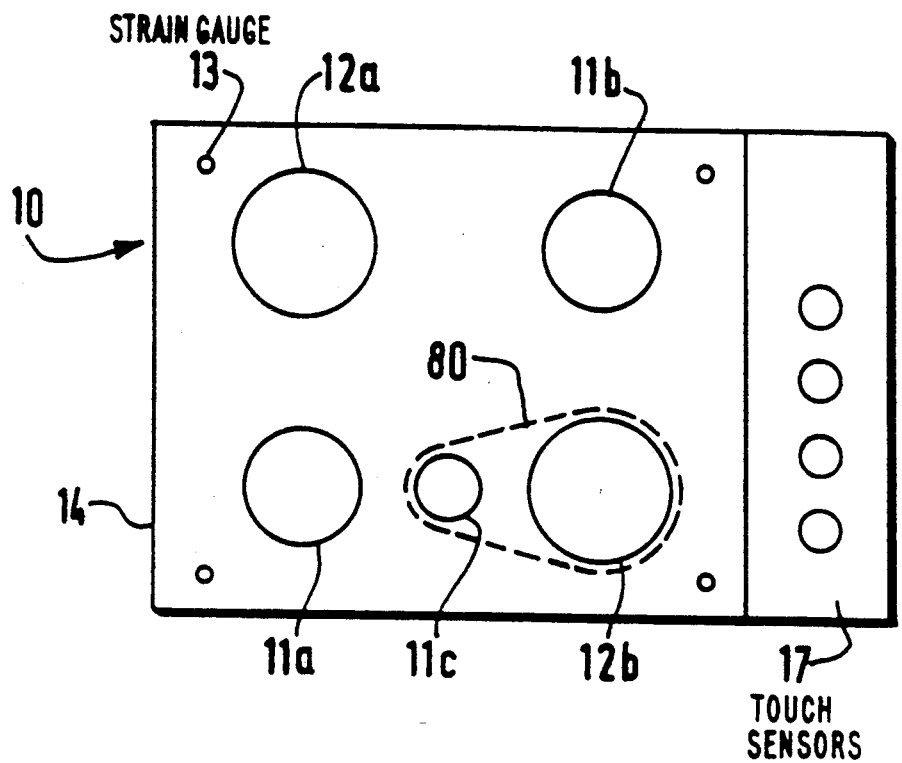
FIG. 8 illustrates a modification of the cook-top.

FIG. 8 illustrates one type of arrangement of the heating elements. In addition to the heating elements 11a, 11b, 12a, 12b a heating element 11c is shown, to illustrate the possibility of adapting the cook-top provided by the invention. The manufacturer can program the microprocessor for independent or combined operation of the heating elements 11c and 12b. This has the advantage that different models of cook-tops of the same basic construction are possible in order to realize cooking areas of different sizes.

Figures 9A, 9B:
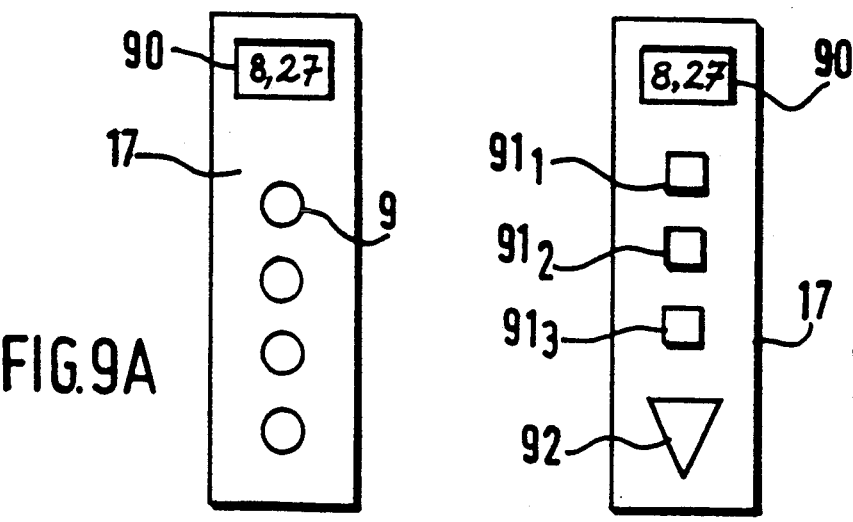
FIGS. 9A and 9B show two different arrangements of manual controls for the user.

Since the cook-top is sensitive to the applied load it may enable not only the location where the load variation has taken place to be determined but also that of the weight variation itself. For this purpose the computing means store the applied forces, i.e. the weight (i.e. the sums of the variations of the forces applied to all the strain-gauge modules), at two different instants to derive the variation of the weight, which is indicated on a display device. When the control means which determine the center of gravity comprise a microprocessor, the latter may also form the means for computing the weight. They can carry out taring. FIG. 9A shows the manual control zone 17 in which the knobs 9 are situated. The display device 90 is preferably arranged in this zone.

The arrangement shown in FIG. 9B also enables the manual control knobs to be dispensed with. Since the glass-ceramic plate is sensitive to the applied forces the user can exert pressure on the glass-ceramic plate with his hand to give a manual command. As the control means detect the center of gravity of the applied force it is possible to detect small pressure zones and thus to have various commands. FIG. 9B shows the manual command zone 17 in which areas $91_1$, $91_2$, $91_3$ are indicated where the user should exert pressure to give the manual commands. These may be on-off commands. Gradual commands 92 are also possible. For example, the apex of the triangle represents a low-power setting and the upper side of this triangle represents a high-power setting. Any other representation is possible. The command may consist in a measurement of the duration or the magnitude of the pressure exerted by the user at the positions marked (for example with $+/-$). This processing is effected by the microprocessor 75 (FIG. 7). By programming the microprocessor different coefficients can be assigned to the strain gauges near the touch-control zones and the cooking zones. After it has been determined in a first time interval that the touch-control zone has been actuated it is possible to increase the accuracy of the measurements in the touch-control zone. The areas $91_1$, $91_2$, $91_3$ for the entry of the manual commands are marked on the glass-ceramic plate by silk-screening painting techniques or in any other way.

The control means are then programmed to recognize these different touch-control commands. Moreover, the manufacturer of such cook-tops has the possibility to modify the configuration of the cook-top in order to obtain several models. These touch controls can be arranged anywhere on the glass-ceramic plate, their location (outside the heated areas) being defined by programming. In this way a basic construction which can be customized can be obtained.

Said touch-control zone 17 can also accommodate the display device 90, for example a LED device, to display the weighing information or other information.

The zones thus defined for touch-control and for the cooking areas can thus be programmed to obtain the desired commands and also to ensure that any action on the remainder of the surface of the glass-ceramic plate has no effect. In this way it is possible to provide neutral zones which can be used for other purposes by the user.

In FIG. 8 the zone reserved for the heating element and that for the touch controls are accommodated on one and the same glass-ceramic plate. However, it is possible to arrange these zones on two separate and independent plates. In that case each of the two plates comprises three (or four) strain gauges. The two glass-ceramic plates are joined by a continuous and flexible seal (for example of an elastomer) to form a double plate and allow it to be cleaned without any unevenness or difference in level between the two zones. Nevertheless, the electrical and electronic control means can have common elements, in particular the microprocessor.

We claim:

1. A cook-top (10) comprising a plurality of heating elements (11a, 12a) activated by function controls, wherein the heating elements are covered by a plate (15) which is fixedly connected to strain-gauge modules (30) which detect forces exerted on the plate by loads placed above the heating elements, control means (70, 75, 76) identifying such a heating element whose load has been subject to a variation, by computing the center of gravity of said forces, and influencing its electric power supply.

2. A cook-top as claimed in claim 1, wherein the control means (70, 75, 76) turn off or reduce the electric power supply to the identified heating element when its load is removed.

3. A cook-top as claimed in claim 1 or 2, wherein the control means (70, 75, 76) control the electric power supply to the identified heating element when the relative load variations are small.

4. A cook-top as claimed in claim 1, for which the arrangement of the strain gauges (30) is such that without a separate external load the principal load of the strain gauges is formed by the weight of the plate.

5. A cook-top as claimed in claim 1, for which the arrangement of the strain gauges (30) is such that without a separate external load the strain gauges support substantially the entire weight of the cook-top.

6. A cook-top as claimed in claim 1 which comprises either three (3a, 3b, 3c) or four (4a, 4b, 4c) strain-gauge modules.

7. A cook-top as claimed in claim 1, wherein at least one heating element is arranged closer to one of the strain gauges than the other heating elements to increase the detection sensitivity for said heating element.

8. A cook-top as claimed in claim 1, wherein the load variation is converted into a measure of the weight by means which compute (75) and display (90) the weight of the load.

9. A cook-top as claimed in claim 8, wherein it comprises taring means.

10. A cook-top as claimed in claim 1, wherein the control means can be programmed to determine the size of a cooking area by functionally rearranging a plurality of heating elements.

11. A cook-top as claimed in claim 1, wherein the plate has at least one touch-control zone (17) for manual actuation of the function controls.

12. A cook-top as claimed in claim 1, wherein said plate includes touch controls.

13. A cook-top as claimed in claim 11, wherein the control means can be programmed to modify the arrangement of the touch controls.

14. A cook-top as claimed in claim 12 wherein the control means can be programmed to modify the arrangement of the touch controls.

* * * * *